United States Patent [19]
Dickinson et al.

[11] Patent Number: 5,265,874
[45] Date of Patent: Nov. 30, 1993

[54] CASHLESS GAMING APPARATUS AND METHOD

[75] Inventors: Peter D. Dickinson, Reno; Charles T. Schreiber, Sparks; Logan Pease, Reno, all of Nev.

[73] Assignee: International Game Technology (IGT), Reno, Nev.

[21] Appl. No.: 829,097

[22] Filed: Jan. 31, 1992

[51] Int. Cl.⁵ ............................................... A63F 9/00
[52] U.S. Cl. .................................. 273/138 A; 364/412
[58] Field of Search .................. 273/138 A, 143, 434; 194/210, 217; 364/412

[56] References Cited

U.S. PATENT DOCUMENTS

| | | | |
|---|---|---|---|
| 4,339,798 | 7/1982 | Hedges | 273/138 A X |
| 4,575,622 | 3/1986 | Pellegrini | 273/434 X |
| 4,669,596 | 6/1987 | Capers et al. | 194/210 |
| 4,669,730 | 6/1987 | Small | 273/138 A |
| 4,675,515 | 6/1987 | Lucero | 235/381 |
| 4,689,742 | 8/1987 | Troy et al. | 273/138 A X |
| 4,815,741 | 3/1989 | Small | 273/138 A |
| 5,007,641 | 4/1991 | Seidman | 273/138 A |
| 5,038,022 | 8/1991 | Lucero | 273/138 A X |
| 5,080,364 | 1/1992 | Seidman | 273/138 A |
| 5,096,195 | 3/1992 | Gimmon | 273/138 A |
| 5,135,224 | 8/1992 | Yamamoto et al. | 273/143 R |
| 5,197,094 | 3/1993 | Tillery et al. | 273/434 X |

Primary Examiner—William H. Grieb
Attorney, Agent, or Firm—Townsend and Townsend Khourie and Crew

[57] ABSTRACT

A cashless gaming apparatus and method suitable for casinos. A player hands over money and an ID card to a clerk at a validation terminal. The clerk stores the ID number and the amount of money in the memory of the validation terminal. Then the clerk returns the ID card to the player for operating any one of a number of game terminals. The player then selects a game terminal which reads the player's ID card, whereupon the cash amount from the validation terminal is downloaded to the selected game terminal and the game terminal can then be played. If the player wishes to play another game terminal, the player actuates a cashout switch on the current terminal. The player then moves to another game terminal and the player's ID card is read into the second game terminal, whereupon the money remaining as a cash amount is downloaded to the second game terminal. The player can then play the second game terminal. When the player wishes to stop play of the game terminals completely, the player actuates the cashout switch of the last game terminal played. The player presents his ID card to the clerk at the validation terminal and the validation terminal reads the ID card. A ticket showing the card number and the cash amount is printed and the player is paid the cash amount on the spot. The printed ticket is then used for reconciliation.

17 Claims, 3 Drawing Sheets

CASHLESS GAMING APPARATUS AND METHOD

This invention relates to improvements in the playing of games using coins, chips and other credit items, and, more particularly, to game terminals and a method for playing game terminals at any one of a number of different locations of a gaming establishment without the need for such credit items.

BACKGROUND OF THE INVENTION

In gaming establishments, such as casinos or the like, a large number of game terminals are placed throughout such an establishment. Players of the game terminals select the game terminal which they wish to play and either obtain coins or chips from a roving change clerk or use the coins or chips or other credit items in their possession at the time they select a game to play.

Typically, a game player obtains additional change for playing games from the roving change clerk who carries a certain amount of money and makes change on the spot near a game terminal operated by a game player. In the alternative, the game terminal can have a bill acceptor and coin handling means wherein the game player can obtain additional change by operating the bill acceptor so as to avoid having to call on the change clerk to make change for continued play of the game.

The disadvantage of this game playing technique is that, when the game player runs out of change, coins or chips, the player may not be able to continue to play the game terminal for some time, at least for several minutes or more, because the change clerk who makes the change is not immediately available. Moreover, a certain amount of time is required to operate a bill acceptor in that the person must take a bill out of his pocket, place it in the bill acceptor and then scoop up the change from the bill acceptor before depositing the change in the game terminal and continuing to play the game terminal. This stoppage reduces profits in that it reduces the amount of money fed to the game terminal. It also increases game terminal costs which must include a bill acceptor, coin handling means and/or a printer. This additional peripheral costs could run as high as $1,000 per terminal.

Because of the foregoing drawbacks, a need exists for improvements in apparatus and method for the play of a game or games without the need for cash in the form of coins, chips and other credit items. The present invention satisfies this need.

Disclosures relating to this general subject matter include the following U.S. Patents:

| | | |
|---|---|---|
| 4,689,742 | 4,669,730 | 4,575,622 |
| 4,675,515 | 4,815,741 | |
| 4,669,596 | 4,339,798 | |

SUMMARY OF THE INVENTION

The present invention is directed to a cashless gaming apparatus and method which is suitable for gaming applications including route operations, gaming devices in casinos and video lottery inventions. This invention eliminates the need for bill acceptors, coin handling equipment and printers at various game terminals of a casino or other gaming establishments, thus saving as much as $1,000 per game terminal.

The apparatus and method of the present invention operate in such a way that, instead of a player playing with change, coin, chips or other credit items, the player hands over a certain amount of money to a clerk at a validation terminal. The clerk also takes an ID card from the player and stores the number of the ID card and the cash amount handed over by the player in the memory of the validation terminal. Then the clerk returns the ID card to the player for his use in operating any one of a number of game terminals.

The player then takes the ID card to any game terminal in the casino or gaming establishment. The player's ID card is read by the game terminal card reader of a selected game terminal, whereupon the cash amount at the validation terminal is downloaded and displayed to the player on the selected game terminal. Operation of that game terminal by the player can then begin. The player continues to play the selected game terminal as long as desired or as long as a cash amount remains on the game terminal.

If the player wishes to play a different game terminal, the player actuates a cashout switch on the game terminal currently being played. The game terminal uploads the cash amount balance to the validation terminal. The player then moves to a different game terminal. The player's ID card is read by the new game terminal, whereupon the cash amount balance at the validation terminal is downloaded and displayed to the player on the new game terminal. The player can then play the new game terminal.

Finally, when the player wishes to stop play of the game terminal completely, the player again pushes the cashout switch. The game terminal then uploads the cash amount balance to the validation terminal. The player then takes his ID card to the validation terminal and the clerk at the validation terminal reads the card to obtain the ID information and the cash amount balance therefrom. A ticket showing the ID card number and the cash amount is printed on the validation terminal printer and the player is paid the cash amount on the spot. The printed ticket is then used for reconciliation.

The primary object of the present invention is to provide an improved apparatus and method for playing a game without a need for cash in the form of coin, chips and other credit items, wherein the apparatus and method require only an ID card and a payment of cash to a validation clerk at a central location to allow the holders of the card to play any one of a number of game terminals at any time so long as a positive balance is maintained in the cash amount of the player to thereby avoid the need for coins, chips, change or other credit items which must be fed in series into a game terminal to operate the same.

BRIEF DESCRIPTION OF THE DRAWINGS

FIG. 1 is a block diagram of a validation terminal and one or more game terminals coupled together to form a cashless gaming system for a gaming establishment or the like;

DETAILED DESCRIPTION OF THE DRAWINGS

Figure 1:
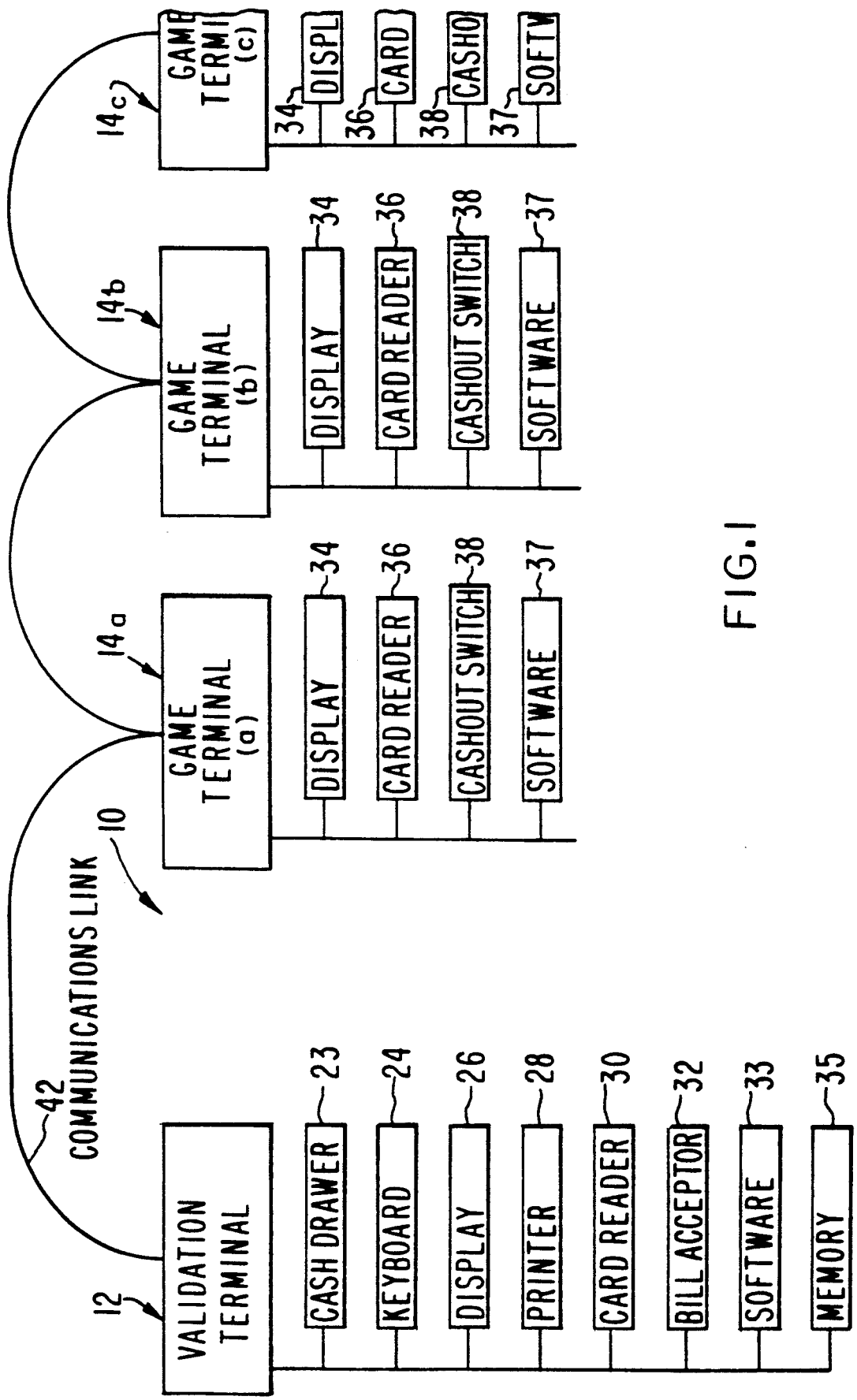
Figure 2:
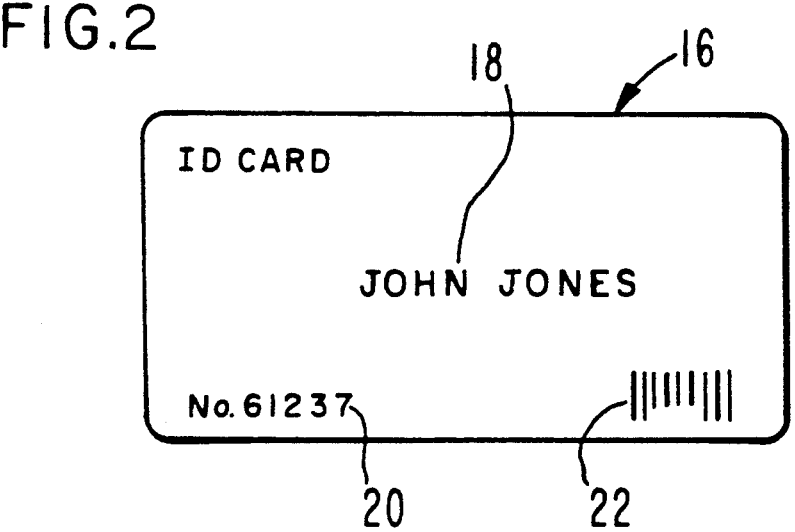
FIG. 2 is a top plan view of one style of ID card used by a player of a game terminal of the system.

The gaming system of the present invention is broadly denoted by the numeral 10 and is illustrated in block form in FIG. 1. The system 10 is made up of three major entities, namely, a validation terminal 12, one or more game terminals 14, and a player of the gaming system 10, such person being identified by an ID card 16 having certain information on it, such as the bearer's name 18, an ID number 20, and an encoded number (bar code, optical code or magnetic code) 22, if desired or deemed necessary.

Figure 4:
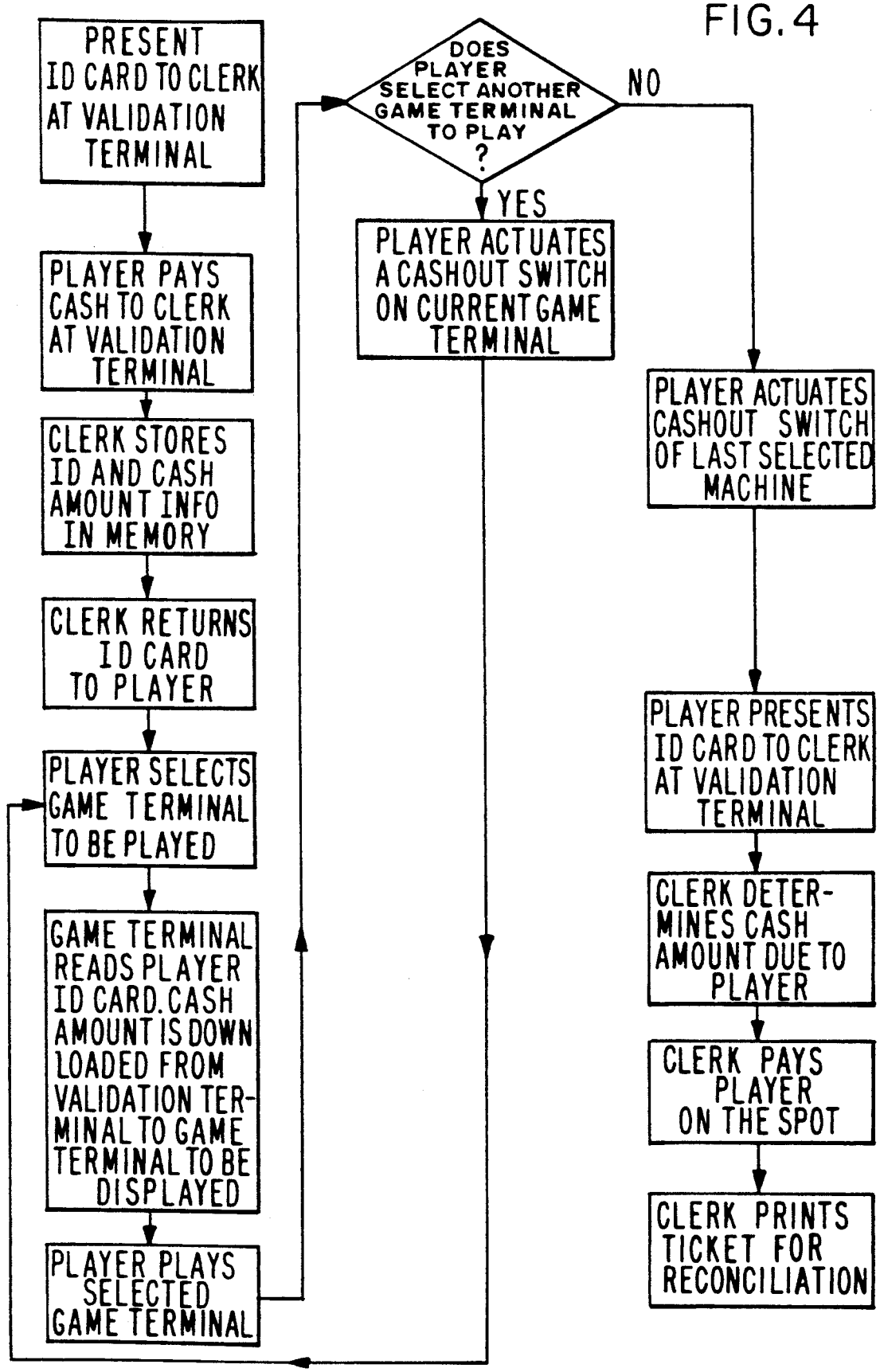
FIG. 4 is a flow chart of the operation of the gaming system of FIG. 1.

The validation terminal includes a cash drawer 23, a keyboard 24, a display 26, a printer 28, a card reader 30 and a bill acceptor 32. All of these components are coupled with the validation terminal 12 and cooperate with each other to carry out the steps of a certain algorithm as outlined in the flow chart of FIG. 4 and which is inherent in software 33 used for programming of the validation terminal.

Each game terminal 14 includes a display 34, an ID card reader 36, a cashout switch 38, software 37 and communication links 42 with interconnect validation terminal 12 and each of the game terminals 14.

Figure 3:
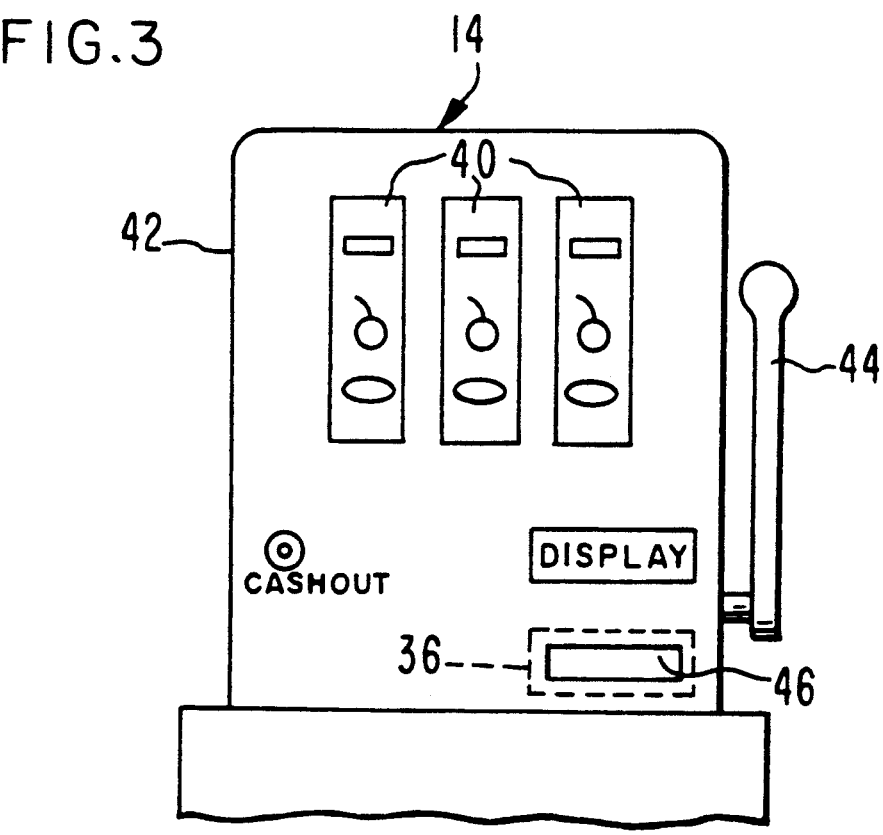
FIG. 3 is a front elevational view of a game terminal of the slot machine type.

Each game terminal 14 can be of any suitable construction. For purposes of illustration, a game terminal 14 is shown in FIG. 3 and is of the slot machine type in which windows 40 are in the front of a housing 42 and the windows permit the viewing of symbols on reels in the housing. The game terminal also has a lever 44 which is manually pulled to actuate the play of the game using the game terminal 14. The various game terminals 14 are at spaced locations in a casino or other gaming establishment.

Each game terminal 14 has a card reader 46 for reading the ID card 16 of a player of the game.

The system is actuated when the player proceeds to the validation terminal which is operated by a clerk. The player presents to the clerk at the validation terminal the cash in the amount that the player would like to play with, such as $50 or the like. The clerk enters the cash amount paid by the player to the clerk. This is entered by way of the keyboard 24 into the validation terminal. In the alternative method, the player inserts one or more bills into the bill acceptor 32. This cash amount is stored in the memory 35 of validation terminal, and such amount is available to the player for playing any one or more of a number of gaming terminals 14 associated with system 10.

At the validation terminal, the clerk asks the player for an ID card 16. The card is read by the card reader 30 of validation terminal 12. The clerk then returns the ID card to the player who retains possession of the card at all times thereafter. The validation terminal now associates the cash amount entered with the ID card number and stores both the cash amount and the ID card number in the memory 35 of the validation terminal 12.

The player than proceeds to any game terminal 14, such as game terminal 14a, and the game terminal reads the ID card 16 by way of card reader 36. The game terminal software 37 stores the ID card number, and then transmits it to the validation terminal over the communication link 42.

The validation terminal 12 receives the ID card number and retrieves the cash amount associated with the ID card number from its memory. The cash amount retrieved is then transmitted back to the game terminal over the communication links 42 between the validation terminal 12 and the selected game terminal 14a. The selected game terminal 14a receives the cash amount and shows it in display 34 associated with the game terminal so that the player will know at all times the status of the cash amount. The player can then start the play of the game associated with game terminal 14a.

As the game is progressively played, the cash amount can be used up or supplemented by winnings. At all times, the cash amount of the player is displayed in the corresponding display 34.

If the player wishes to play a different game terminal 14 and has a cash amount remaining on the current game terminal or if the player wishes to redeem a cash balance and leave the casino or establishment having the game terminals 14, the player actuates a cashout switch 38 on the game terminal currently being played. The current game terminal transmits the cash amount along with the ID card number stored in the game terminal to the validation terminal 12 over the communications link 42. The validation terminal 12 receives the cash amount and the ID card number and stores the cash amount associated with the ID card number.

If the player proceeds to a different game terminal 14, the foregoing procedure is followed for the second or new game terminal 14. The player continues to play at the second or new game terminal until the player wishes to cash out or if the player runs out of cash altogether.

If the player wishes to redeem a cash amount, the following step is performed: the player presents the validation clerk with his ID card and asks for a cash out. The ID card received from the player is read by the card reader 30 of the validation terminal 12. The validation terminal 12 checks its memory 35 for the ID card number and any cash amount associated with it. Such amount is displayed on the validation terminal display 26 and printed by printer 28 as a cashout receipt. The clerk pays the player the cash amount displayed on the cashout receipt and returns the ID card to the player. The clerk places the cashout receipt in cash drawer 23 for reconciliation.

The present invention includes a cashless gaming system with distributed data storage which allows for playing of any one of a number of game terminals 14 as selected by the player. Instead of allowing the player to play with coins, chips or the like, the player hands over his money to the validation clerk who inserts the money in the form of bills in the bill acceptor 32 and reads the ID card 16 of the player in the validation terminal 12. The player can then take the ID card 16 to any game terminal 14 and the card reader 36 of the selected game terminal can identify the cash amount to be downloaded into the selected game terminal 14 from the validation terminal 12. Play of the game terminal can thus be initiated and maintained so long as the cash amount is a positive value.

The present invention solves most if not all of the problems currently proposed with conventional gaming methods. The system of the present invention applies to applications ranging from route operations to casinos to video lotteries and would eliminate the need to have a bill acceptor, coin handling or printer at each game terminal, thus saving as much as $1,000 per terminal.

What is claimed is:
1. Game playing apparatus comprising:
  a validation terminal having a card reader and a memory; a plurality of game terminals spaced from the validation terminal; communication means coupling the validation terminal to each game terminal, respectively; a player ID card having identification information thereon, said card adapted to be read by the card reader of the validation terminal and to be coupled to the memory for placing said ID information into memory; means coupled with the validation terminal for providing cash amount data to the memory corresponding to the ID information of the card, said validation terminal through said communication means being operable for enabling each of the game terminals when a positive cash amount is in the validation terminal as cash data associated with a particular ID card of a player, each game terminal having a card reader for reading the ID information from a player card, said card being operable to allow a player to play any of the game terminals so long as a positive cash amount is in the validation terminal, each game terminal having a display showing the current cash amount available to the player, each said game terminal further including a cashout device for allowing the player of a first game terminal to cash out from the first game terminal and to use an ID card to enable a second game terminal for play of a game of the second game terminal, said cashout device further permitting the player to receive the cash amount from the validation terminal upon a decision to withdraw from further play of the game of any of the game terminals.

2. A system as set forth in claim 1, wherein said means for entering the amount in the memory of the validation terminal includes a keyboard.

3. A system as set forth in claim 1, wherein is included a bill acceptor for receiving cash, and means for directing the cash amount from the cash of the validation terminal.

4. A system as set forth in claim 1, wherein said validation terminal has a printer for printing a receipt associated with the cashout payment of the cash amount of a player to the player.

5. A system as set forth in claim 1, wherein said validation terminal has means for positioning a clerk at the validation terminal to receive the cash from a prospective player and to enter the player ID and cash information in memory.

6. A system as set forth in claim 1, wherein said printing means includes a printer for printing a cashout receipt.

7. A system as set forth in claim 1, wherein is included means for programming the validation terminal.

8. A method of playing a game comprising:

providing a plurality of game terminals at spaced locations from a validation terminal having a memory;

paying cash to a clerk at the validation terminal to provide a cash amount to be used in playing the game terminals; storing the ID information of a player and information about the cash amount in memory;

electing a game terminal to be played;

downloading the cash amount from the memory of the validation terminal to the selected game terminal to enable operation of the game terminal;

playing the selected game terminal;

notifying the validation terminal of the desire to discontinue further play of any game terminal; and paying the cash amount stored in memory to the player who has cashed out.

9. A method as set forth in claim 8, wherein said cashout step includes printing a receipt containing the amount paid to the player with the receipt being used for reconciliation purposes.

10. A method as set forth in claim 8, wherein said read-in of player ID cash and payment information to the clerk includes operating a keyboard.

11. A method as set forth in claim 8, wherein said step of entering the player ID information includes reading an ID card of the player into a card reader of the validation terminal.

12. A method as set forth in claim 11, wherein said reading step includes reading the information from the card as the card is read by the card reader.

13. A method as set forth in claim 8, wherein is included the step of determining whether a second terminal is to be played;

actuating a cashout device if it is determined that a second terminal has been or is to be selected for play;

downloading the ID information and the cash amount remaining to the second game terminal; and playing the second game terminal.

14. A method as set forth in claim 13, wherein the step of actuating a cashout device includes actuating a switch.

15. A method as set forth in claim 8, wherein the notifying step includes reading an ID card by the card reader of the validation terminal.

16. A method as set forth in claim 8, wherein is included the step of displaying the cash amount to the player of a game terminal.

17. A method as set forth in claim 16, wherein the displaying step includes reading an ID card by the card reader of the game terminal.

* * * * *